United States Patent
Gabay

(10) Patent No.: US 8,553,941 B2
(45) Date of Patent: Oct. 8, 2013

(54) METHODS, CIRCUITS, DEVICES, APPARATUSES AND SYSTEMS FOR PROVIDING IMAGE COMPOSITION RULES, ANALYSIS AND IMPROVEMENT

(71) Applicant: Chanan Gabay, Kfar Saba (IL)

(72) Inventor: Chanan Gabay, Kfar Saba (IL)

(*) Notice: Subject to any disclaimer, the term of this patent is extended or adjusted under 35 U.S.C. 154(b) by 0 days.

(21) Appl. No.: 13/742,386

(22) Filed: Jan. 16, 2013

(65) Prior Publication Data
US 2013/0129146 A1    May 23, 2013

Related U.S. Application Data

(63) Continuation of application No. 13/008,055, filed on Jan. 18, 2011, now Pat. No. 8,379,999.

(51) Int. Cl.
*G06K 9/00*        (2006.01)

(52) U.S. Cl.
USPC ........... 382/103; 382/190; 382/209; 382/278; 358/537; 358/540; 358/450

(58) Field of Classification Search
USPC ......... 382/103, 190, 209, 278, 282, 284, 294; 358/537, 538, 540, 450, 452, 453
See application file for complete search history.

(56) References Cited

U.S. PATENT DOCUMENTS

| | | | | |
|---|---|---|---|---|
| 6,556,775 B1 * | 4/2003 | Shimada | ........................ | 386/241 |
| 6,909,792 B1 * | 6/2005 | Carrott et al. | ................. | 382/128 |
| 7,027,054 B1 * | 4/2006 | Cheiky et al. | ................. | 345/473 |
| 7,194,327 B2 * | 3/2007 | Lam | ............................. | 700/132 |
| 7,436,998 B2 * | 10/2008 | Steinberg et al. | ............. | 382/167 |
| 7,738,731 B2 * | 6/2010 | Aiso | ............................ | 382/284 |
| 8,031,258 B2 * | 10/2011 | Enge et al. | .................... | 348/350 |
| 8,050,519 B2 * | 11/2011 | Katsumata et al. | ........... | 382/284 |
| 8,068,168 B2 * | 11/2011 | Haubmann | .................... | 348/360 |
| 8,069,169 B2 * | 11/2011 | Fitzpatrick et al. | ........... | 707/732 |
| 8,170,299 B2 * | 5/2012 | Tanaka et al. | ................ | 382/118 |

\* cited by examiner

*Primary Examiner* — Yosef Kassa
(74) *Attorney, Agent, or Firm* — Vladimir Sherman; Professional Patent Solutions

(57) ABSTRACT

The present invention includes methods, circuits, devices, apparatuses and systems for analyzing, characterizing and/or rating the composition of images. Further embodiments of the present invention include methods, circuits, devices, apparatuses and systems for providing instructive feedback or automatic corrective actions, relating to the quality of the composition of an image, to a user of an imaging device (e.g. digital camera, camera phone, etc.)—Optionally while the user is preparing to acquire an image, i.e. in real time. Embodiments of the present invention may further include methods, circuits, devices, apparatuses and systems for extracting image composition related rules based on analysis of composition parameters of rated images.

10 Claims, 9 Drawing Sheets

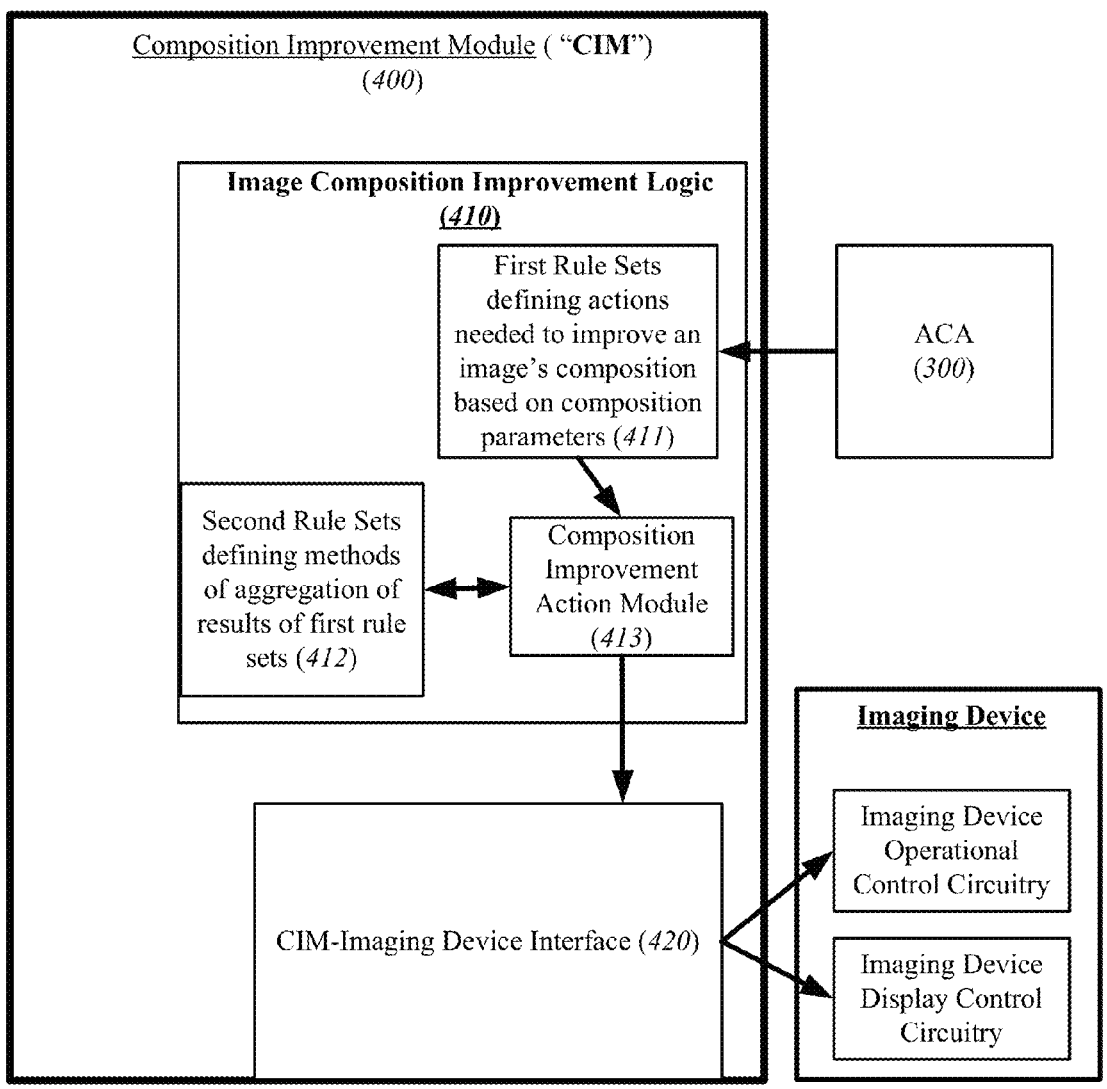

METHODS, CIRCUITS, DEVICES, APPARATUSES AND SYSTEMS FOR PROVIDING IMAGE COMPOSITION RULES, ANALYSIS AND IMPROVEMENT

FIELD OF THE INVENTION

The present invention generally relates to the field of photography. More specifically, the present invention relates to methods, circuits, devices, apparatuses and systems for providing image composition analysis and improvement.

BACKGROUND

Since the beginning of known history, men and women have been creating visual images to stimulate emotional responses from others and from themselves. Endless hours of human endeavor have been devoted to attempts to create such images, wherein the value of the created images appears to be in direct relation to the intensity or complexity of the resulting emotional response. Accordingly, the value of an image may be different for different individuals, as each individual's emotional response may differ, being affected by his/her own personality, previous experiences, associations, etc. Accordingly, across time and cultures, men and women have passionately and relentlessly labored in attempts to find which images illicit which emotional responses from which people? Despite all the efforts and considerable advancement in this matter, this search is by no means over.

Experience has shown that a human's emotional response to an image is not only based on which objects or area are portrayed/appear in the image, but is also largely based on the arrangement, visual characteristics and interrelations of the objects portrayed/appearing in the image—largely referred to as the "composition" of the image. Thus, artists have continuously searched, defined, argued, re-defined, experimented, discovered, argued and otherwise developed rules, theories and methods for correctly composing images to illicit the best emotional response—otherwise known as art.

Once the camera was invented it was only natural that this search turn also to the captured image (photograph), as a desire to capture visually pleasing images quickly grew. The development of photography as an art form became inevitable. Whether for artistic purposes, or just for the everyday user of a camera, the study of the desired composition of images was now turned towards the captured image as well. Anyone who has ever used a camera can tell you, that one photograph may be a "good" photograph, whereas another photograph of the exact same scene, including the exact same objects is a "bad" photograph. The question then becomes, what makes a photograph a "good" photograph or a "bad" photograph? And what actions may be performed to improve the composition of a captured image (photograph)?

Unfortunately, the answers to these questions are as complex and elusive as the human psyche they seek to effect. It would therefore be desirable to find further methods to develop criteria and guidelines to appraise and improve the quality of the composition of images. Preferably, utilizing the advanced processing equipment available in modern times.

Seeking to improve the composition of the images they capture, many people study, practice, experiment and devote other efforts to this affect. The end result, however, despite the availability of many guides on the subject, often times, especially for the amateur photographer, is that the process of taking a picture, while exercising all the composition lessons he/she has learned, becomes a tedious and time consuming process of shifting, changing lighting, repositioning, recalculating and so on. On many occasions, the process is so long it is simply impractical to fully perform for each photo or requires extensive preparations. It would therefore also be desirable to provide a device capable of automatically assisting a user of an imaging device with improving the quality of the composition of photographs he/she captures. Such a device would be especially useful if it could be integrated into the imaging device and interactive with the imaging device's other components.

SUMMARY OF THE INVENTION

The present invention includes methods, circuits, devices, apparatuses and systems for analyzing, characterizing and/or rating the composition of images. Further embodiments of the present invention include methods, circuits, devices, apparatuses and systems for providing instructive feedback, relating to the quality of the composition of an image, to a user of an imaging device (e.g. digital camera, camera phone, etc.)—Optionally while the user is preparing to acquire an image, i.e. in real time. Yet further embodiments of the present invention include methods, circuits, devices, apparatuses and systems for providing automatic modification and/or improvement of the quality of the composition of an image being captured by an imaging device. Such embodiments may include methods, circuits, devices, apparatuses and systems for automatically controlling aspects of an image capturing device's operation. Embodiments of the present invention may further include methods, circuits, devices, apparatuses and systems for extracting image composition related rules based on analysis of composition parameters of rated images. Furthermore, embodiments of the present invention may further include methods, circuits, devices, apparatuses and systems for modifying the operations and/or parameters of operation of the above mentioned embodiments based on a user's preferences and/or photo history.

According to some embodiments of the present invention, there may be provided an Image Composition Rule Creator adapted to extract rules and or values relating to desired/undesired parameters and/or combinations of parameters in the composition of an image, based on the analysis of one or more, rated or otherwise valuated, images. An Image Composition Rule Creator may be comprised of composition-rule-creating logic adapted to: (1) analyze one or more images, (2) extract one or more composition parameters relating to the composition of the images (e.g. lighting parameters, parameters relating to objects' positioning and relations within an image, parameters relating to view angle, color parameters, etc.), (3) correlate specific composition parameters, composition parameter values and/or combinations of specific parameters and specific parameter values with a rating or other indication of the images composition quality, and (4) extract raw rules defining composition parameter values and relations associated with higher/lower ratings/quality of an images composition. Furthermore, an Image Composition Rule Creator may be further adapted to: (5) create lists/scales of desired/undesired image composition parameters and/or image composition parameter rules, based on the raw extracted rules. An Image Composition Rule Creator may store lists/scales of desired/undesired image composition parameters, lists/scales of desired/undesired image composition parameter combinations and/or image composition parameter rules in one or more associated Desired Composition Parameters Databases.

An Image Composition Rule Creator may be comprised of:

(1) a Feature Extracting Module comprising feature-extracting logic adapted to recognize, isolate and/or characterize objects in an image;

(2) a Composition Parameter Extracting Module comprising parameter-extracting logic adapted to extract parameters relating to objects recognized in an image by the feature extractor (e.g. size, distance, characterization (human face, building, tree, etc.), angle, shadow, etc.) and the relations between them (e.g. relative positions, relative distances from the imaging device, relative height, etc.) and parameters relating to the entire image (e.g. lighting, view angle, background, etc.);

(3) a Composition Parameter Characterizing Module comprising correlation logic adapted to correlate higher/lower image composition ratings with specific composition parameter values, composition parameter relations and/or combinations of specific composition parameter values and relations (raw rules defining composition parameter values and relations associated with higher/lower ratings of images). For example: (1) image parameters or combinations of image parameters found to be common among highly rated images may be given positive value, and (2) image parameters or combinations of image parameters found to be common among poorly rated images may be given negative value; and (4) a Composition Rule Extracting Module comprising rule-extracting logic adapted to create lists/scales of desired/undesired image composition parameters and/or image composition parameter rules, based on the correlations found by the Composition Parameter Characterizing Module. A Composition Rule Extracting Module may store lists/scales of desired/undesired image composition parameters, lists/scales of desired/undesired image composition parameter combinations and/or image composition parameter rules in one or more associated Desired Composition Parameters Databases.

According to further embodiments of the present invention, one or more Desired Composition Parameters Databases may be pre-populated with lists/scales of desired/undesired image composition parameters, lists/scales of desired/undesired image composition parameter combinations and/or image composition parameter rules, based on known principles of photography and/or based on professional references in the field of image composition. Furthermore, one or more Desired Composition Parameters Databases may be pre-populated with multiple sets of: (1) lists/scales of desired/undesired image composition parameters, (2) lists/scales of desired/undesired image composition parameter combinations, and/or (3) image composition parameter rules, corresponding to different styles of photography, different trends in photography, different experts opinion, and/or any other diversity in image composition quality appraisal.

Desired Composition Parameters Databases and/or ancillary processing logic may be further pre-programmed with Desired Composition Parameters Implementation Logic, defining the hierarchy and/or other interrelations between the lists/scales of desired/undesired image composition parameters, lists/scales of desired/undesired image composition parameter combinations and/or image composition parameter rules.

Accordingly, an Image Composition Rule Creator may store lists/scales of desired/undesired image composition parameters, lists/scales of desired/undesired image composition parameter combinations and/or image composition parameter rules that it extracts, in one or more Desired Composition Parameters Databases, wherein:

(1) Desired/undesired composition parameter lists/scales and rules extracted by the Image Composition Rule Creator may be stored in parallel (separately) to pre-programmed lists/scales and/or rules, in the same data storages and/or in separate data storages. It should be noted that, as different sets of lists/scales and/or rules, representing different references/authorities used to create them, may be pre-programmed into a data storage, similarly different sets of lists/scales and/or rules, representing different sets of images or image ratings used to create them, may be stored by an Image Composition Rule Creator. In other words, different sets of lists/scales and/or rules may be stored representing different rating schemes or different rating authorities. For example, one or more separate sets of lists/scales and/or rules may be stored for one or more users, wherein each set is based on the ratings of one of the users, and thus each user can access data based on his/her own ratings;

(2) Desired/undesired composition parameter lists/scales extracted by the Image Composition Rule Creator may be stored within pre-programmed lists/scales and/or rules, according to one or more pre-determined and/or calculated hierarchy rules. i.e. extracted lists/scales and/or rules may be added to the pre-programmed lists/scales and/or rules according to a pre-defined order;

(3) Desired/undesired composition parameter lists/scales and rules extracted by the Image Composition Rule Creator may be stored in aggregation with previously stored or pre-programmed lists/scales and/or rules according to one or more pre-defined formulas. i.e. an Image Composition Rule Creator, in place of storing one or more extracted lists/scales and/or rules, may modify one or more existing lists/scales and/or rules stored in the data storage, based on a pre-determined calculation; and/or (4) Any combination of 1, 2 and/or 3;

According to some embodiments of the present invention, there may be provided an Automatic Composition Analyzer (hereinafter: "ACA") comprising composition-analyzing logic adapted to analyze the image composition parameters of an image. An ACA may be adapted to compare the composition of an image with lists/scales of desired/undesired image composition parameters, lists/scales of desired/undesired image composition parameter combinations and/or image composition parameter rules contained in one or more associated data storages, such as a Desired Composition Parameters Database and determine one or more image composition ratings/valuations ("composition-quality values") for the image being analyzed. According to further embodiments of the present invention, an ACA may store determined image composition ratings/valuations: (1) in a separate data storage, (2) in the data storage the image(s) are stored in, and/or (3) as metadata associated with the images.

According to some embodiments of the present invention, an ACA may be comprised of:

(1) a Feature Extracting Module comprising feature-extracting logic adapted to recognize, isolate and/or characterize objects in an image;

(2) a Composition Parameter Extracting Module comprising parameter-extracting logic adapted to extract parameters relating to objects recognized in an image by the feature extracting module (e.g. size, distance, characterization (human face, building, tree, etc.), angle, shadow, etc.) and the relations between them (e.g. relative positions, relative distances from the imaging device, relative height, etc.) and parameters relating to the entire image (e.g. lighting, view angle, background, etc.); and (3) an Image Composition Appraising Module comprising appraising logic adapted to compare the composition parameters of an image with lists/scales of desired/undesired image composition parameters and/or lists/scales of desired/undesired image composition parameter combinations contained in an associated data storage and/or with image composition parameter rules contained in an associated data storage. An Image Composition Appraising Module may be further adapted to, based on the results of these comparisons, determine one or more image composition ratings/valuations for the image being analyzed and/or determine composition parameters that, if changed, would improve the composition quality of the image and may be yet further adapted to, based on the results of these comparisons, determine what change is desired.

According to some embodiments of the present invention, there may be provided a Composition Improvement Module (Hereinafter: "CIM"), functionally associated with an ACA. A CIM may be comprised of composition-improvement logic adapted to apply image composition improvement logic on a set of image composition parameters and/or image composition ratings/valuations relating to an image and to determine, based on an aggregation of the results of the application of the improvement logic, corrective actions to be taken to improve the composition of the image. A CIM may include composition-improvement logic comprised of: (1) one or more first rule sets defining actions to be taken to improve an image's composition based on one or more of the image's composition parameters and/or one or more of the image's composition ratings/valuations, and (2) one or more second rule sets defining the methods of aggregation of the results of implementing two or more of the rules contained in the first rule sets on the composition parameters of a specific image (e.g. hierarchy rules, conflict resolution rules, etc.). According to some embodiments of the present invention, a CIM may further comprise a Composition Improvement Action Module, comprising action logic adapted to implement the first rule sets on a given image, in accordance with the interrelations defined in the second rule sets, and determine one or more corrective actions to be taken to improve the composition of the image.

A CIM may include a CIM-Imaging Device Interface comprising interfacing logic adapted to: (1) automatically implement the determined corrective actions by modifying settings/operations of the imaging device (i.e. directly controlling aspects of the imaging device's operation—for example by automatically manipulating the portion of the image sensed being captured (shifting and cropping), manipulating the magnification (zoom), manipulating the depth of field (shutter size), etc.; and/or (2) display or otherwise advise a user of an imaging device associated with the image, the determined corrective actions.

According to further embodiments of the present invention, a CIM, in conjunction with an ACA, may be further adapted to perform multiple iterations of composition analysis and correction—i.e. once the corrective actions determined by the CIM have been performed, an ACA may analyze the new image and determine composition parameters and appraisal for the new image, the CIM may then determine corrective actions to be performed to improve the composition of the new image, and so on for a pre-defined number of iterations or until a pre-defined composition level has been reached. Furthermore, a module within the CIM or an ancillary module (hereinafter: "CIM Operation Evaluation Module"), may be further adapted to analyze the results of the CIM's operations, based on the appraisals performed by an ACA on images corrected by the CIM, and accordingly adjust image composition improvement logic used by the CIM, either by modifying one or more of the first sets of rules or by modifying the methods of their aggregation (the second sets of rules).

According to some embodiments of the present invention, a first ACA may be functionally associated with a first imaging device, such as a digital camera, and adapted to analyze the composition parameters of images captured by the first imaging device's image sensor. The first ACA may acquire the images to be analyzed from an integral buffer processing the sensed images for the imaging device, from a dedicated buffer and/or from the imaging device's internal data storage. The ACA may be adapted to compare the composition of an analyzed image with lists/scales of desired/undesired image composition parameters, lists/scales of desired/undesired image composition parameter combinations and/or image composition parameter rules contained in one or more associated Desired Composition Parameters databases, which data storages may be integral to the imaging device or otherwise functionally associated with the ACA.

The first ACA may be further functionally associated with a first CIM, also installed within or otherwise functionally associated with the first imaging device, and adapted to determine corrective actions to be taken to improve the image composition of images analyzed by the ACA (i.e. images being sensed by the imaging device).

The first CIM may further include a CIM-Imaging Device Interface comprising processing logic adapted to: (1) automatically implement the determined corrective actions by modifying settings/operations of the imaging device (i.e. directly controlling aspects of the imaging device's operation—for example by automatically manipulating the portion of the image sensed being captured (shifting and cropping), manipulating the magnification (zoom), etc.; and/or (2) display or otherwise advise a user of an imaging device associated with the image, the determined corrective actions. The CIM-Imaging Device Interface or a parallel user interfacing module may be further adapted to display to a user of the Imaging Device the results and or parameters relating to the ACA's analysis of an image. The CIM-Imaging Device Interface or a parallel user interfacing module may be yet further adapted to display to a user any other parameters relating to the operations of the ACA and/or CIM and may further provide control elements for a user to input instructions or make modifications regarding these operations.

According to further embodiments of the present invention, there may be provided an Image Composition Rating Module comprising rating logic adapted to assign one or more image composition-quality values to an image. An Image Composition Rating Module may be further adapted to store the assigned values as meta-data associated with the image and/or in an associated Image Composition Ratings Database.

An Image Composition Rating Module may assign image composition-quality values to an image, representing:
  (1) an overall rating of the quality of the composition of an image,
  (2) ratings of the quality of specific aspects of an image's composition,
  (3) ratings of the quality of the composition of an image according to a specific source,
  (4) aggregations and/or combinations of 1, 2 and/or 3, and/or
  (5) any other rating relating to the quality of the composition of an image.

An Image Composition Rating Module may assign image composition-quality values to an image based on:

(1) one or more ratings and/or other valuations assigned to an image, overall or to a specific aspect of the image, by one or more viewers who have viewed and rated the image. Accordingly, an Image Composition Rating Module may be further adapted to receive image ratings and/or valuations entered by users via an appropriate user interface;

(2) one or more ratings and/or other valuations assigned to an image, overall or to a specific aspect of the image, by a specific viewer of the image (e.g. a user of the specific rating module, an expert or other authority, etc.) Accordingly, an Image Composition Rating Module may be further adapted to receive image ratings and/or valuations entered by a specific viewer via an appropriate user interface;

(3) one or more ratings and/or other valuations previously assigned to and associated with an image, overall or to a specific aspect of the image, such as a rating of the image stored as metadata of the image previously by another application or system. Accordingly, an Image Composition Rating Module may be further adapted to retrieve image ratings and/or valuations from data storages and/or other sources where images with ratings/valuations are stored;

(4) based on the source of the image. For example, all images within a specific set of images, may be assigned a certain rating and/or valuation. E.g. a set of images displaying photos by a famous photographer may all be assigned a high composition rating, or a set of images obtained from a certain textbook or journal, may be assigned certain ratings/valuations, and so on. Accordingly, an Image Composition Rating Module may be further adapted to receive, through an appropriate interface, sets of images and to assign the images within the sets image ratings and/or valuations associated with the source of the specific set of images;

(5) one or more ratings and/or other valuations assigned to an image, overall or to a specific aspect of the image, by an image rating forum or similar method. Accordingly, an Image Composition Rating Module may be further adapted to retrieve image ratings and/or valuations assigned to images by such forums or similar methods via an appropriate interface;

(6) an aggregation or average of one or more of 1-5 above. Accordingly, an Image Composition Rating Module may further include image rating aggregation logic defining the methods of aggregation or averaging of the ratings/valuations; and/or (7) any other rating and/or valuation associated with the image.

According to yet further embodiments of the present invention, there may be provided an Image Rating Forum Module adapted to facilitate the rating and/or valuation of images by multiple viewers. An Image Rating Forum Module may comprise rating-forum logic adapted to facilitate the viewing and rating/valuation of images stored in an associated image data storage by multiple viewers via an appropriate user interface. An Image Rating Forum Module may be further adapted to interface with users over a distributed data network (such as the internet), and facilitate the viewing and rating/valuation of images by multiple users via the network. An Image Rating Forum Module may further comprise rating-forum logic adapted to aggregate the ratings/valuations of multiple users into one or more aggregated ratings/valuations. Clearly, many various methods of aggregation may be employed. Furthermore, a rating/valuation of an image assigned to an image by an Image Rating Forum Module may be assigned based on one or more a user inputs (e.g. a numeric rating of the image on a scale of 1-10, "like/dislike" input, etc.), upon one or more user actions relating to the image (e.g. if a user downloads an image from the forum) and/or upon any other rating scheme known today or to be devised in the future.

According to some embodiments of the present invention, an Image Rating Forum Module may be functionally associated with an Image Composition Rating Module and/or directly with an Image Composition Rule Creator, such that the Rule Creator may use ratings/valuations provided by the Forum Module to create lists/scales of desired/undesired image composition parameters, lists/scales of desired/undesired image composition parameter combinations and/or with image composition parameter rules.

Furthermore, an Image Rating Forum Module may be functionally associated with an imaging device and further adapted to receive images from the device, either images stored in the device or currently being sensed by the image sensor of the imaging device. The Image Rating Forum Module may be adapted to send a rating/valuation of images received from the imaging device back to the imaging device, such that a user of the device may receive real-time, or close to real time, ratings/valuations of images from the Rating Forum.

According to some embodiments of the present invention, there may be provided Personalization Logic, as part of one or more of the other components described above and/or as a separate module. Personalization Logic may be adapted to record, analyze and/or store one or more specific users' usage history and/or preferences and may be further adapted to modify the operation of an imaging device, an Image Composition Rule Creator, an ACA, a CIM and/or an Image Composition Rating Module according to the history and/or preferences of a specific user.

It should be understood that references to an imaging device in this disclosure are intended to include any device adapted to capture an image sensed by an image sensor, such as a camera (e.g. a digital camera), and/or any device or processing logic adapted to retrieve and/or display images stored in a data storage, such as an image viewing computer application (e.g. picassa). Accordingly, it should be understood that the teachings of this disclosure relating to an image currently being captured by an imaging device may be equally implemented on an image currently being displayed or retrieved from a data storage containing images (e.g. a user's personal photos file).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3A: is a block diagram of an exemplary Composition Improvement Module (CIM) [400], in accordance with some embodiments of the present invention;

Figure 1:
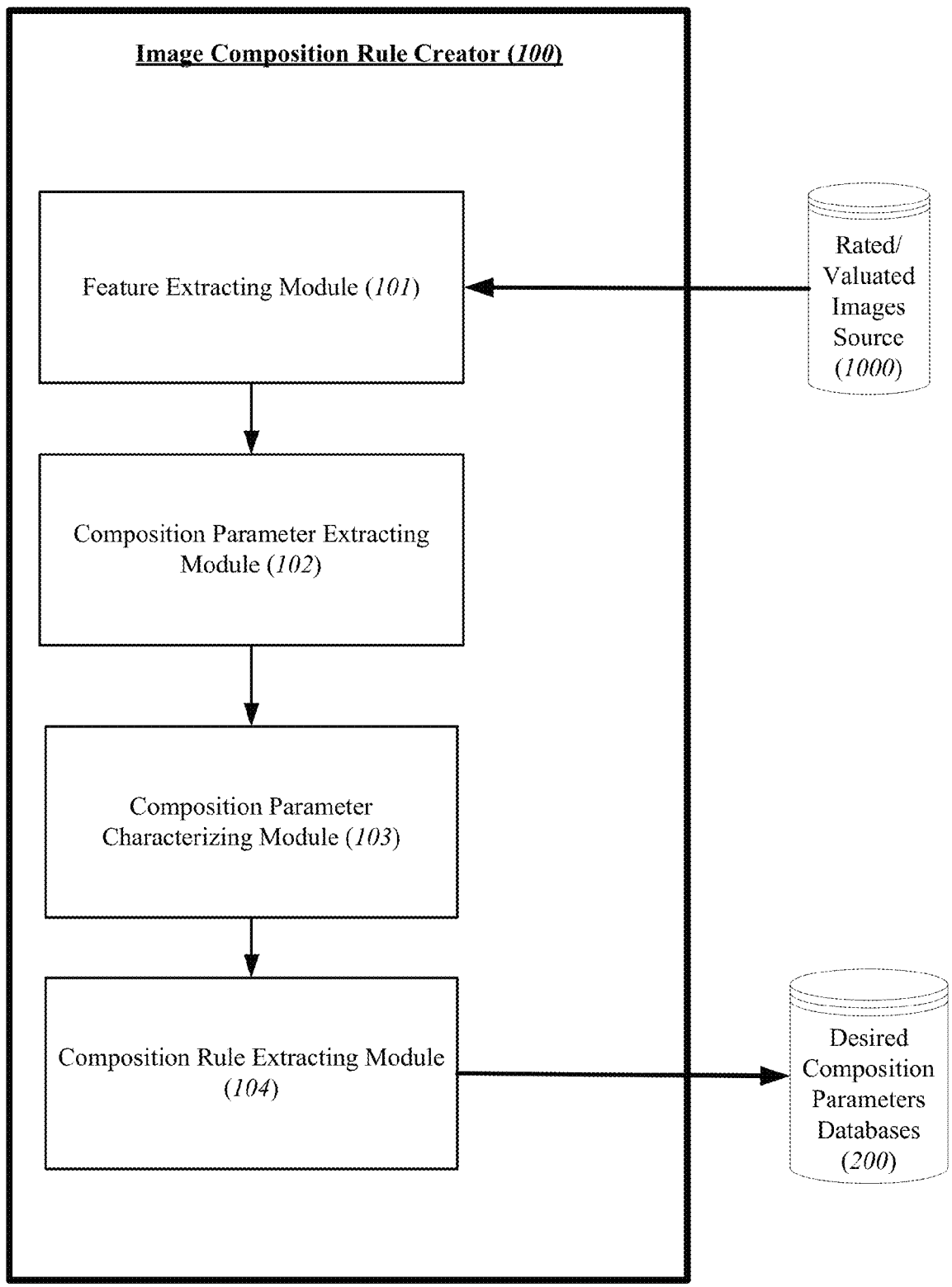
FIG. 1: is a block diagram of an exemplary Image Composition Rule Creator [100], in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

It should be understood that the accompanying drawings are presented solely to elucidate the following detailed description, are therefore, exemplary in nature and do not include all the possible permutations of the present invention.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, including mobile phone or any mobile device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer or phone or any other computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

It should be understood that any topology, technology and/or standard for computer networking (e.g. mesh networks, infiniband connections, RDMA, etc.), known today or to be devised in the future, may be applicable to the present invention.

In the following detailed description references to the figures appear in brackets. Numbers or letters appearing in brackets, e.g. [500], excluding paragraph numbers, should be understood to refer to elements marked within the figures by the same number and/or letter which appears in the brackets.

The present invention includes methods, circuits, devices, apparatuses and systems for analyzing, characterizing and/or rating the composition of images. Further embodiments of the present invention include methods, circuits, devices, apparatuses and systems for providing instructive feedback, relating to the quality of the composition of an image, to a user of an imaging device (e.g. digital camera, camera phone, etc.)— Optionally while the user is preparing to acquire an image, i.e. in real time. Yet further embodiments of the present invention include methods, circuits, devices, apparatuses and systems for providing automatic modification and/or improvement of the composition of an image being captured by an imaging device. Such embodiments may include methods, circuits, devices, apparatuses and systems for automatically controlling aspects of an image capturing device's operation. Embodiments of the present invention may further include methods, circuits, devices, apparatuses and systems for extracting image composition related rules based on analysis of composition parameters of rated images. Furthermore, embodiments of the present invention may further include methods, circuits, devices, apparatuses and systems for modifying the operations and/or parameters of operation of the above mentioned embodiments based on a user's preferences and/or photo history.

According to some embodiments of the present invention, there may be provided an Image Composition Rule Creator (hereinafter referred to as a "Rule Creator") [100] [see FIG. 1] adapted to extract rules and or values relating to desired/undesired parameters and/or combinations of parameters in the composition of an image, based on the analysis of one or more sets of one or more rated images, or images otherwise valuated in relation to composition (hereinafter referred to collectively as "valuated images"). In other words, a Rule Creator may be adapted to: (1) receive one or more valuated images, (2) analyze the composition parameters of the valuated images and (3) extract rules and/or values defining the desired/undesired composition parameters and composition parameter combinations to achieve the best composition of an image, based on the composition parameters of the analyzed images and their ratings/valuations. For example (Example A), a Rule Creator which receives a set of images having a high composition-quality value, may find in its analysis of these images that in all these images the main object occupies 25-27% of the image. This Rule Creator may, accordingly, extract a rule defining the desired composition parameter relating to the ratio between the size of the main object in an image and the size of the entire image as being between 25-27%. In a further example (Example B), a Rule Creator which receives a set of images having a low composition-quality value, may find in its analysis of these images that in all these images a human is located to the side of an animal located in the center of the image. This Rule Creator may, accordingly, extract a rule defining the undesired composition parameter combination of Human+Animal, wherein the animal is positioned in the center and a human is positioned to the side of the animal.

A Rule Creator may be comprised of rule-creating logic adapted to: (1) analyze one or more valuated images, (2) extract one or more composition parameters relating to the composition of the images (e.g. lighting parameters, parameters relating to objects' positioning and relations within an image, parameters relating to view angle, color parameters, etc.), (3) correlate specific composition parameters, composition parameter values and/or combinations of specific parameters and specific parameter values with a rating or other indication of the valuated image's composition quality, and (4) extract raw rules defining composition parameter values and relations associated with higher/lower ratings/quality of an images composition. Furthermore, a Rule Creator may be further adapted to: (5) create lists/scales of desired/undesired image composition parameters and/or parameter combinations and/or image-composition-parameter rules, based on the raw extracted rules.

According to yet further embodiments of the present invention, a Rule Creator may be further adapted to: (1) analyze valuated images in order to, (2) detect the co-existence of two or more desired/undesired composition parameters and/or desired/undesired composition parameter combinations, previously extracted by the Rule Creator and/or contained in an associated data storage(s), within these images and (3) extract rules defining the hierarchy and/or relative weight of raw extracted rules.

According to some embodiments of the present invention, a Rule Creator may store lists/scales of desired/undesired image composition parameters, lists/scales of desired/undesired image composition parameter combinations and/or image-composition-parameter rules in one or more associated Desired Composition Parameters Databases [200].

*Hereinafter, "lists/scales of desired/undesired image composition parameters, lists/scales of desired/undesired image composition parameter combinations and/or image-composition-parameter rules"—may collectively be referred to as: "image-composition-parameter rules". Accordingly, any reference in this application to "image-composition-parameter rules" should be understood to include: (1) lists and/or scales of desired and/or undesired image composition parameters, (2) lists and/or scales of desired and/or undesired image composition parameter combinations, and/or (3) image-composition-parameter rules—relating to desired and/or undesired image composition parameters and/or image composition parameter combinations.

An Image Composition Rule Creator may be comprised of:

(1) a Feature Extracting Module [101] comprising feature-extracting logic adapted to recognize, isolate and/or characterize objects in an image. The Feature Extracting Module may be adapted to recognize isolate and/or characterize objects such as Humans and Human body parts (e.g. face, smile, arm, etc.), Animals, Houses and other Human constructions (e.g. bridge, gate, door, football field, etc.), topographical contours (e.g. horizon, mountain range, etc.), natural objects (e.g. tree, waterfall, flower, etc.), devices (e.g. phone, lawnmower, etc.), tools (e.g. hammer, machinery. etc.), vehicles (e.g. car, bicycle, wagon, etc.), furniture and other human possessions (e.g. table, chair, teddy bear, etc.) and/or any other objects which may appear in images (e.g. hat, unexplained flying object, reflective surface, etc.).

The Feature Extracting Module may base its recognitions, isolations and characterizations on detected object's silhouette, color, size and/or any other relevant parameter in comparison to pre-programmed definitions of the parameter values associated with specific objects, which may be stored on an associated data storage. For example, two roughly parallel arrays of close parallel lines separated by white rectangles may be recognized as a smile.

For example, in Example A, the Feature Extracting module may recognize and isolate an object positioned in the center of some of the images, and characterize the objects as being the main object of the image. In Example B, the Feature Extracting module may recognize and isolate an object positioned in the center of some of the images, and characterize the objects as being animals, and further recognize and isolate objects to the side of some of the dogs and characterize some of the objects as being a Human;

(2) a Composition Parameter Extracting Module [102] comprising parameter-extracting logic adapted to extract parameters relating to objects recognized in an image by the feature extractor (e.g. size, distance, characterization (human face, building, tree, etc.), angle, shadow, etc.) and the relations between them (e.g. relative positions, relative distances from the imaging device, relative height, etc.) and parameters relating to the entire image (e.g. lighting, view angle, background, etc.). The Composition Parameter Extracting Module may comprise parameter-extracting logic adapted to extract these parameters from an image based on the color and location of the pixels which comprise the object (parameters such as object size, height, relative position, lighting, etc. may thus be determined), based on characterizations made by the Feature Extractor and/or based on patterns of pixel color and location (parameters such as shadow, view angle, characterization, etc. may thus be determined).

For example, in Example A, a Composition Parameter Extracting Module may extract the parameters of size related to the recognized objects (the objects of the images) based on the number of pixels comprising the objects, and the parameter of size of the entire images based on the number of pixels contained in each entire image. In Example B, a Composition Parameter Extracting Module may extract the parameters of characterization of the two recognized objects (Human and Animal) based on the characterizations performed by the feature Extractor, and the parameters of the relative locations of each of the objects based on the relative locations of the pixels comprising the objects.

A description of some examples of methods for identifying objects within images and extracting parameters relating to the identified objects may be found in the book: "*Feature Extraction and Image Processing*" by Mark S. Nixon & Alberto S. Aguado [2008], which is hereby incorporated by reference in its entirety.

(3) a Composition Parameter Characterizing Module [103] comprising correlation logic adapted to correlate higher/lower image composition ratings with specific composition parameter values, composition parameter relations and/or combinations of specific composition parameter values and relations (raw rules defining composition parameter values and relations associated with higher/lower ratings of images). For example: (1) image parameters or combinations of image parameters found to be common among highly rated images may be given positive value, and (2) image parameters or combinations of image parameters found to be common among poorly rated images may be given negative value.

For example, in Example A, a Composition Parameter Characterization Module may correlate a parameter of relative size of a main object of 25-27% in relation to the size of the entire image with high composition ratings. In Example B, a Composition Parameter Characterization Module may correlate a combination of composition parameters consisting of Human+Animal, wherein the Animal is centered and the Human is to the side with low composition ratings; and (4) a Composition Rule Extracting Module [104] comprising rule-extracting logic adapted to create image-composition-parameter rules, based on the correlations found by the Composition Parameter Characterizing Module. A Composition Rule Extracting Module may store image-composition-parameter rules in one or more associated Desired Composition Parameters Databases.

For Example, in Example A, a Composition Rule Extracting Module may create a image-composition-parameter rule defining the desired relation between the size of a main object in an image and the size of the entire as 25-27%. Alternatively, a Composition Rule Extracting Module may create a scale of desired size relation between a main object and an image, wherein 26% is the preferred relation and composition quality is reduced as the relation moves from this point, either up or down. In Example B, a Composition Rule Extracting Module may create a image-composition-parameter rule defining the combination of Human+Animal, wherein the animal is closer to the center than the Human as undesirable, or alternatively a rule defining when a Human and Animal appear in the same image the composition quality will improve the closer the Human is to the center of the image in relation to the distance the animal is from the center of the image, i.e. when Human+Animal=Human should be closer to the center.

According to further embodiments of the present invention, one or more Desired Composition Parameters Databases [200] may be pre-populated with image-composition-parameter rules, based on known principles of photography, based on professional references in the field of image composition and/or based on any other source of image composition rules. Furthermore, one or more Desired Composition Parameters Databases may be pre-populated with multiple sets of image-composition-parameter rules, corresponding to different styles of photography, different trends in photography, different experts' opinion, and/or any other diversity in image composition quality appraisal.

In other words, according to some embodiments of the present invention, one or more Desired Composition Parameters Databases [200] may be pre-populated with sets of image-composition-parameter rules relating to the desired composition parameters in an image based on existing knowledge or theories relating to image composition, wherein different sets may be based on or represent different sources of this knowledge and/or these theories.

Some examples of sets of pre-stored image composition rules may include:
  a. The rule of thirds—main objects in an image should be located as close as possible to points located ⅓ of the distance between opposing sides in both dimensions;
  b. Background focus rule—background should be significantly less focused than main objects;
  c. Leading line rule—if there is a line shaped object in the background of an image, the view angle of the image should be positioned such that the line leads to the main object in the image;
  d. Any other rule relating to the desired composition of an image.

Some examples of known image composition rules, and guidelines which may be represented as rules, may be found in the book: "*Mastering Photographic Composition, Creativity, and Personal Style*" by Alain Briot [2009], which is hereby incorporated by reference in its entirety.

Desired Composition Parameters Databases and/or ancillary processing logic may be further pre-programmed with Desired Composition Parameters Implementation Logic, defining the hierarchy and/or other interrelations between the image-composition-parameter rules. For example, a Desired Composition Parameters Implementation Logic may include a rule defining the rule of thirds as being inferior to (e.g. of lesser weight or to be implemented only when not in conflict with) the Leading Line rule.

Accordingly, an Image Composition Rule Creator may store image-composition-parameter rules that it extracts, in one or more Desired Composition Parameters Databases, wherein:

(1) image-composition-parameter rules extracted by the Image Composition Rule Creator may be stored in parallel (separately) to pre-programmed and/or previously stored image-composition-parameter rules, in the same data storages and/or in separate data storages. It should be noted that, as different sets of image-composition-parameter rules, representing different references/authorities used to create them, may be pre-programmed into a data storage, similarly different sets of image-composition-parameter rules, representing different sets of images or image ratings used to create them, may be stored by an Image Composition Rule Creator. In other words, different sets of image-composition-parameter rules may be stored representing different rating schemes or different rating authorities. For example, one or more separate sets of image-composition-parameter rules may be stored for one or more users, wherein each set is based on the ratings of one of the users, and thus each user can access data based on his/her own ratings;

(2) image-composition-parameter rules extracted by the Image Composition Rule Creator may be stored within pre-programmed and/or previously stored image-composition-parameter rules, according to one or more pre-determined and/or calculated hierarchy rules. i.e. extracted image-composition-parameter rules may be added to the pre-programmed and/or previously stored image-composition-parameter rules according to a pre-defined order.

Figure 2:
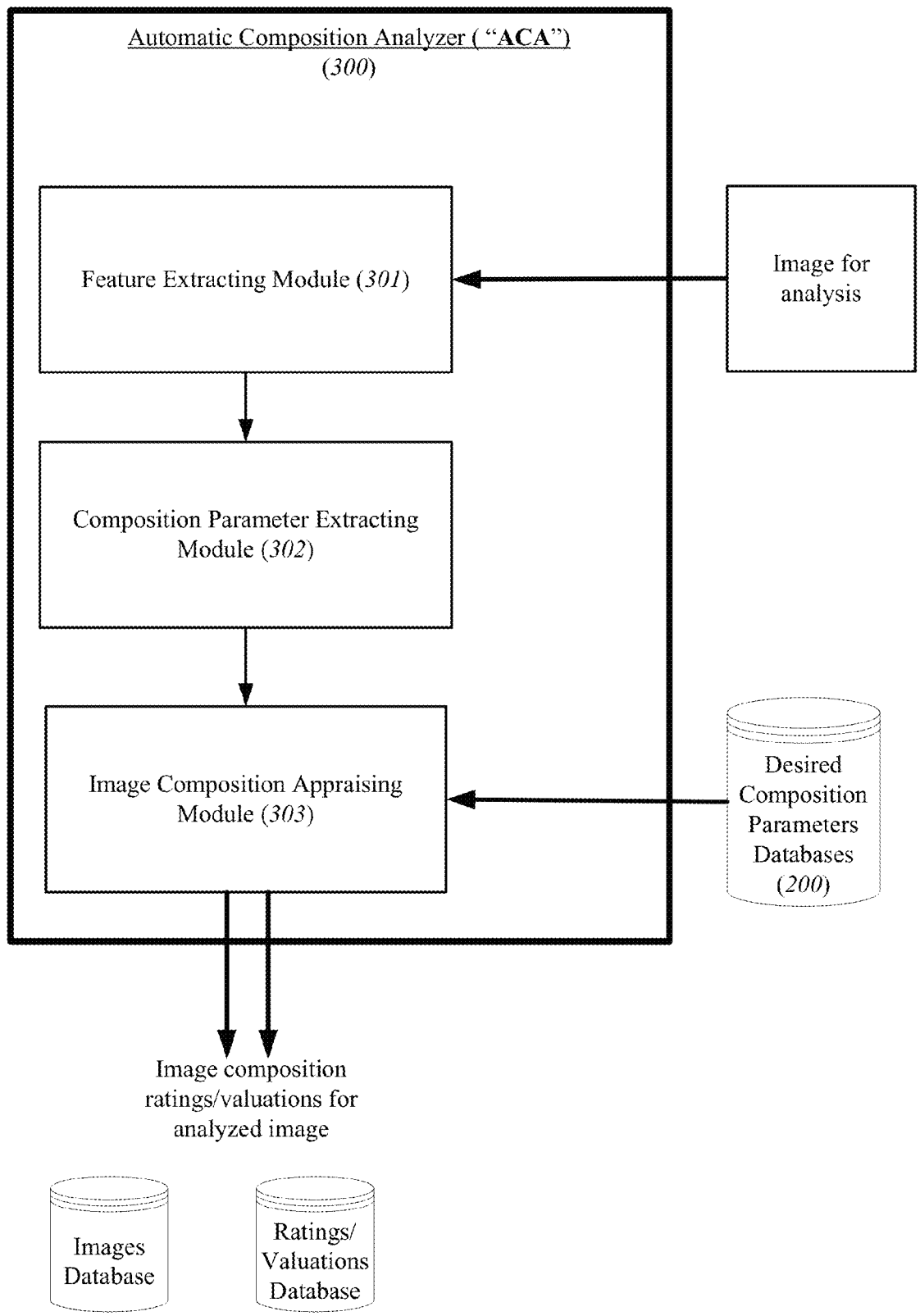
FIG. 2: is a block diagram of an exemplary Automatic Composition Analyzer (ACA) [300], in accordance with some embodiments of the present invention.

For example, extracted rules may be stored within pre-programmed and/or previously stored image-composition-parameter rules above pre-programmed and/or previously stored rules, i.e. as having priority over the pre-programmed and/or previously stored rules in cases of conflict. Alternatively, extracted rules may be stored within pre-programmed image-composition-parameter rules below pre-programmed rules yet above previously stored rules, i.e. pre-programmed rules having priority over the extracted rules in cases of conflict. In a further example, extracted rules may be stored within pre-programmed and/or previously stored rules above certain pre-programmed rules and below other certain pre-programmed rules, i.e. as having priority over some of the pre-programmed rules while being inferior to others, in cases of conflict. In such an example, pre-programmed rules that are to remain above extracted rules would remain fixed and always of high priority, whereas, pre-programmed rules that are to remain below extracted rules are subject to change by extracted rules stored above them. In yet a further example, extracted rules may sometimes be stored above or below certain pre-programmed and/or previously stored rules depending on a relevant criteria, such as the degree of correlation of the rule with higher composition ratings (e.g. if an extracted rule is found to correlate with very high ratings in almost all cases, it may be stored above certain pre-programmed rules, whereas if an extracted rule is found to correlate with high ratings in a smaller majority of cases, it may be stored lower down in the hierarchy of rules);

(3) image-composition-parameter rules extracted by the Image Composition Rule Creator may be stored together with previously stored or pre-programmed rules as new sets of rules representing a combination of the extracted rules and the pre-programmed and/or previously stored or rules according to one or more pre-defined formulas. i.e. an Image Composition Rule Creator, in place of storing one or more extracted rules, may modify one or more existing rules stored in the data storage, based on a pre-determined calculation and/or method, which may involve any relevant criteria or variables, such as the ratings on which each rule was based, the degree of correlation between the parameters on which the rule was based and the related ratings, the chronology, the source of the ratings on which the rules were based (e.g. rules resulting from a user's ratings may be given greater weight than rules resulting from a foreign rating source), and/or any other relevant criteria or variable; and/or (4) Any combination of 1, 2 and/or 3;

According to some embodiments of the present invention, there may be provided an Automatic Composition Analyzer (hereinafter: "ACA") [300] [see FIG. 2] comprising composition-analyzing logic adapted to analyze the image composition parameters of an image. An ACA may be adapted to compare the composition of an image with image-composition-parameter rules contained in one or more associated data storages, such as Desired Composition Parameters Databases [200] and may determine one or more image composition ratings/valuations ("Composition-Quality Values") for the image being analyzed and/or may determine composition parameters that, if changed, would improve the composition quality of the image. In other words, an ACA may be adapted to analyze a given image based on stored composition rules and determine the quality of the composition of the given image, and may be further adapted to indicate those composition parameters that may be changed to improve the given image composition and what change in those parameters is desired.

For example, returning to Example A, an ACA analyzing an image in which the main object occupies 20% of the image may determine that the image composition is fair (7), based on a given desired/undesired composition parameter rule set and may further determine, based on the rule set, that if the relative size of the main object was 30% larger in relation to the image (26% of the entire image) the image composition would improve and may, for further example, also determine that if the main object in the image was 10% farther to the right in relation to the center of the image the image composition may also improve (based on the rule of thirds). Turning to Example B, an ACA analyzing an image in which a dog is positioned in the center of the image with his owner beside him, may determine that the image composition is poor (4), based on a given desired/undesired composition parameter rule set and may further determine, based on the rule set, that if the relative position of the dog and owner would change the image composition may improve.

According to further embodiments of the present invention, an ACA may store determined image composition ratings/valuations and/or composition parameters that may improve composition quality: (1) in a separate data storage, (2) in the data storage the image(s) are stored in, and/or (3) as metadata associated with the images.

According to some embodiments of the present invention, an ACA may be comprised of:

(1) a Feature Extracting Module [301] comprising feature-extracting logic adapted to recognize, isolate and/or characterize objects in an image, as described above regarding the Feature Extracting Module [101] included in Rule Creators, according to some embodiments of the present invention;

(2) a Composition Parameter Extracting Module [302] comprising parameter-extracting logic adapted to extract composition parameters relating to objects recognized in an image by the feature extractor, the relations between them and parameters relating to the entire image, as described above regarding the Composition Parameter Extracting Module [102] included in Rule Creators, according to some embodiments of the present invention;

(3) an Image Composition Appraising Module [303] comprising appraising logic adapted to compare the composition parameters of an image with image-composition-parameter rules contained in an associated data storage. An Image Composition Appraising Module may be further adapted to, based on the results of these comparisons, determine one or more image composition ratings/valuations for the image being analyzed and/or determine composition parameters that, if changed, would improve the composition quality of the image and may be yet further adapted to, based on the results of these comparisons, determine what change is desired; and (4) an Interface adapted to store and/or send determined image composition ratings/valuations and/or composition parameters that may improve composition quality.

Figure 3B:
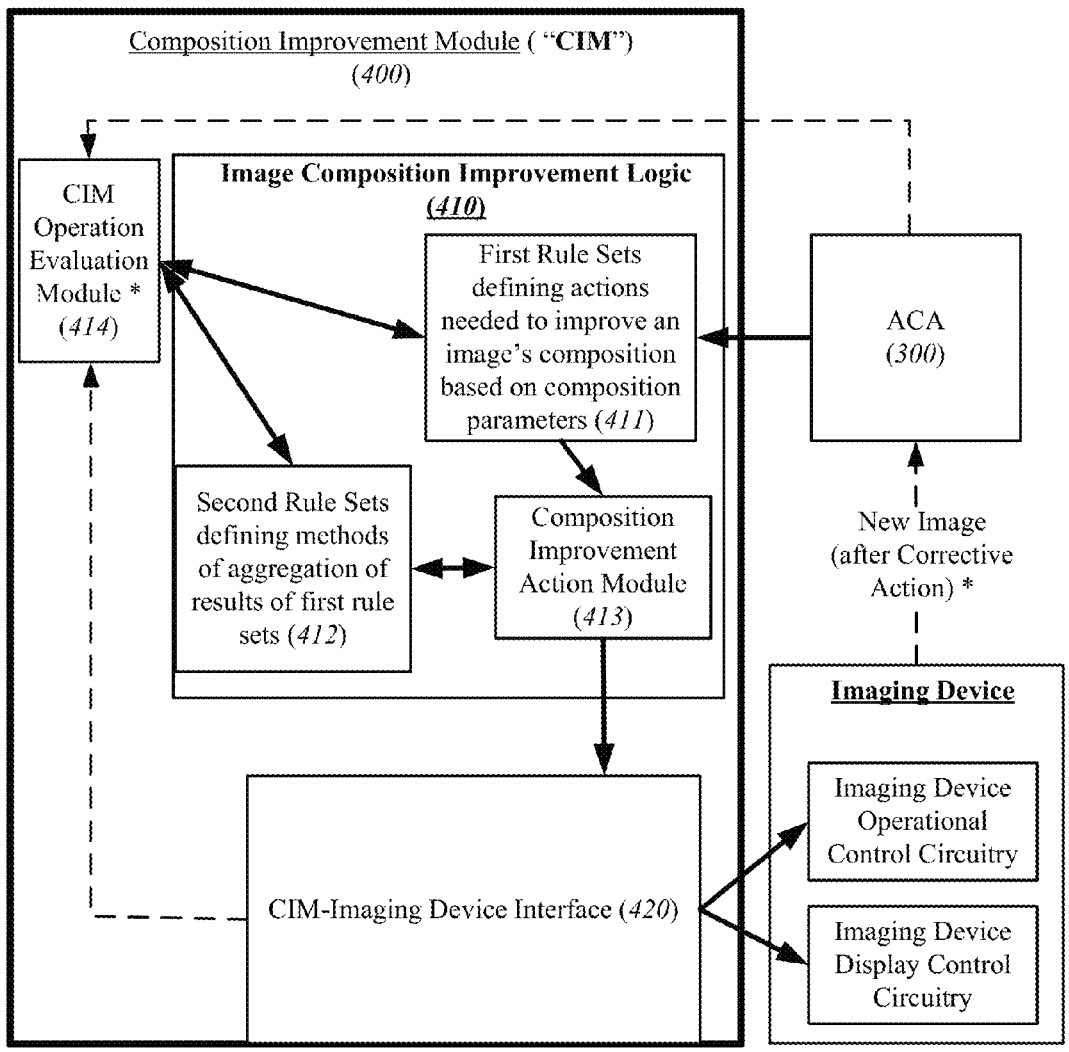
FIG. 3B: is a block diagram of an exemplary Composition Improvement Module (CIM) [400] including a CIM Operation Evaluation Module, in accordance with some embodiments of the present invention.

According to some embodiments of the present invention, there may be provided a Composition Improvement Module (Hereinafter: "CIM") [400] [see FIG. 3A], functionally associated with an ACA. A CIM may be comprised of composition-improvement logic adapted to apply image composition improvement logic on a set of image composition parameters, image composition ratings/valuations and/or composition parameters determined by an ACA that may improve composition quality, relating to an image and to determine, based on an aggregation of the results of the application of the improvement logic, corrective actions to be taken to improve the quality of the composition of the image. A CIM may include composition-improvement logic comprised of: (1) one or more first rule sets [411] defining actions to be taken to improve the quality of an image's composition based on one or more of the image's composition parameters and/or one or more of the image's composition ratings/valuations and/or composition parameters determined by an ACA as parameters that may improve composition quality, and (2) one or more second rule sets [412] defining the methods of aggregation of the results of implementing two or more of the rules contained in the first rule sets on the composition parameters of a specific image (e.g. hierarchy rules, conflict resolution rules, etc.).

According to some embodiments of the present invention, a CIM may further contain a Composition Improvement Action Module [413], comprising action logic adapted to implement the first rule sets on a given image, in accordance with the interrelations defined in the second rule sets, and determine one or more corrective actions to be taken to improve the composition of the image.

For example, returning to Example A, a Composition Improvement Action Module of a CIM analyzing the composition parameters of an image in which the main object occupies 20% of the image may determine that in order to improve composition quality the zoom applied to the image should be increased until the main object occupies 26% of the image. A Composition Improvement Action Module of a CIM may, for further example, also determine that the image frame should be shifted left until the main object in the image is 10% farther to the right in relation to the center of the image (based on the rule of thirds). Turning to Example B, a Composition Improvement Action Module of a CIM analyzing the composition parameters of an image in which a dog is positioned in the center of the image with his owner beside him, may determine that that the image frame should be shifted to the side until the owner is centered in the image with his dog beside him.

A CIM may include a CIM-Imaging Device Interface [420] comprising interfacing logic adapted to:
(1) automatically implement, either completely automatically and/or after a confirmation from the user (semi-automatically), the determined corrective actions by modifying settings/operations of the imaging device (i.e. directly controlling aspects of the imaging device's operation—for example by automatically manipulating the portion of the image sensed being captured (shifting and cropping), manipulating the magnification (zoom), etc.

Examples of automatic implementation may include
a. changing relative size of objects within an image by manipulating the magnification of the image;
b. changing lighting parameters by manipulating the light sensitivity of the image sensor;
c. changing the focus of objects/background by manipulating lens settings;
d. changing the relative location of objects in an image by manipulating the portion of the sensed image being captured (shifting and cropping);
e. changing the view angle by manipulating the angle of the lens;
f. adjusting color of objects by manipulating the processing of an image;
g. adjusting the focus of objects, by adjusting the depth of field (e.g. by modifying the shutter size);
h. adjusting lighting or colors of objects by adjusting shutter speed; and/or
i. any other relevant modification of the imaging device's operation or any combination of the above.

(2) display or otherwise inform (e.g. by an audio signal) a user of an imaging device associated with the image, one or more determined corrective actions.

For example, lighted arrows or similar instructive symbols may be displayed to a user of an imaging device indicating corrective actions to be taken, such as:
a. symbols indicating to a user to modify the relative size of objects within an image by manipulating the magnification of the image;
b. symbols indicating to a user to modify lighting parameters by manipulating the light sensitivity of the image sensor;
c. symbols indicating to a user to modify the focus of objects/background by manipulating lens settings;
d. symbols indicating to a user to modify the relative location of objects in an image by moving the imaging device and/or by manipulating the portion of the sensed image being captured (shifting and cropping);
e. symbols indicating to a user to modify the view angle by moving the imaging device and/or by manipulating the angle of the lens;
f. symbols indicating to a user to modify the color of objects by manipulating the processing of an image;
g. symbols indicating to a user to modify lighting strength or angle by manipulating the light source and/or viewing angle;
h. symbols indicating to a user to modify the position of objects in the image by moving the objects;
i. symbols indicating to a user to modify the focus of objects in the image by modifying the depth of field; and/or
j. any other relevant instructive symbol or indication or any combination of the above.

For example, returning to Example A, a CIM-Imaging Device Interface of a CIM analyzing the composition parameters of an image in which the main object occupies 20% of the image may automatically increase the magnification of the image until the main object occupies 26% of the image. Alternatively, or additionally, a CIM-Imaging Device Interface of a CIM analyzing the composition parameters of an image in which the main object occupies 20% of the image may display to a user of the imaging device capturing the image a symbol indicating the user should increase the magnification of the image until the main object occupies 26% of the image and/or display to a user an indication that this has been performed automatically. A third alternative (semi-automatic) may be performed in which a CIM-Imaging Device Interface indicates to a user of the imaging device that an automatic corrective action of magnification is to be performed and automatically performs the action only after a user interaction with an associated control element (i.e. the user may select whether to have the automatic corrective action performed or not). Turning to Example B, a CIM-Imaging Device Interface of a CIM analyzing the composition parameters of an image in which a dog is positioned in the center of the image with his owner beside him, may automatically, semi-automatically or display to a user an indication to, shift the image frame to the side until the owner is centered in the image with his dog beside him.

According to further embodiments of the present invention, a CIM [400], in conjunction with an ACA [300], may be further adapted to perform multiple iterations of composition analysis and correction—i.e. once the corrective actions determined by the CIM [400] have been performed, an ACA [300] may analyze the new image and determine composition parameters and appraisal for the new image, the CIM [400] may then determine corrective actions to be performed to improve the composition of the new image, and so on for a pre-defined number of iterations or until a pre-defined composition level has been reached. Furthermore, a module within the CIM or an ancillary module (hereinafter: "CIM Operation Evaluation Module") [414] [see FIG. 3B], may comprise evaluation logic adapted to analyze the results of the CIM's [400] operations, based on the appraisals performed by an ACA [300] on images corrected by the CIM [400], and accordingly adjust image composition improvement logic used by the CIM [400], either by modifying one or more of the first sets of rules or by modifying the methods of their aggregation (the second sets of rules). In other words, an ACA [300] may be used to evaluate and improve the function of a CIM [400] by analyzing the quality of the composition of images after the CIM [400] has performed corrective actions upon them.

Figure 4A:
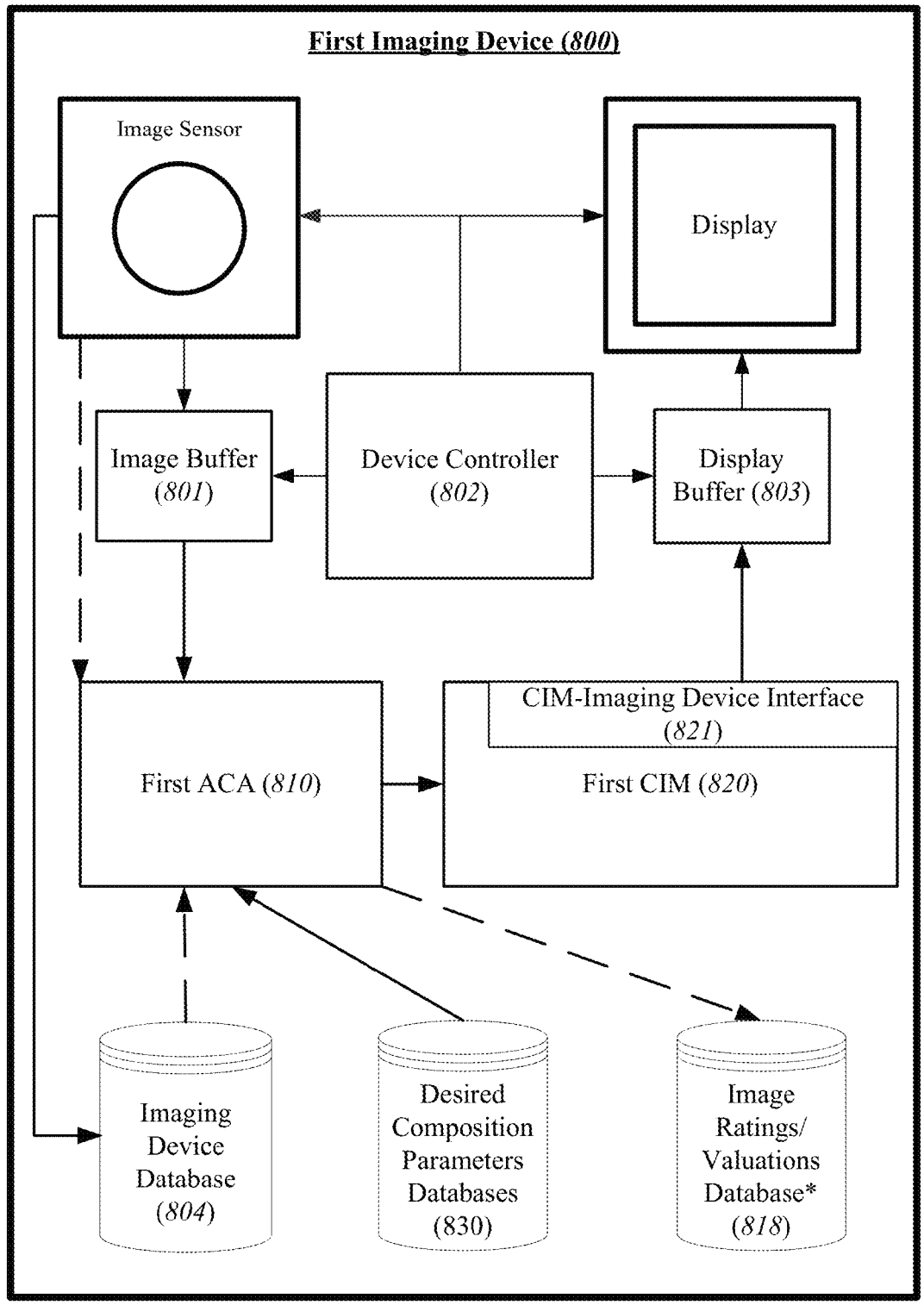
FIG. 4A: is a block diagram of an exemplary First Imaging Device [800], in accordance with some embodiments of the present invention.

According to some embodiments of the present invention, a first ACA [810] may be functionally associated with a first imaging device [800] [see FIG. 4A], such as a digital camera, and adapted to analyze the composition parameters of images captured by the first imaging device's image sensor. The first ACA [810] may acquire the images to be analyzed from an integral buffer [801] processing the sensed images for the imaging device, from a dedicated buffer and/or from the imaging device's internal data storage [804]. The first ACA [810] may be adapted to compare the composition of an analyzed image with image-composition-parameter rules contained in one or more associated Desired Composition Parameters Databases [830], which data storages may be integral to the imaging device or otherwise functionally associated with the first ACA [810].

In other words, a first ACA [810] may be integrated (installed), or otherwise functionally associated with a first imaging device [800] and may be adapted to supply composition analysis of images captured by the imaging device, prior to or after the images are stored. Thus, a first imaging device [800] including a first ACA [810] may be adapted to supply a user of the imaging device [800] with analysis and/or ratings (image composition-quality values) of the composition of an image being captured by the imaging device, prior to and/or after the image is stored.

For example, returning again to the principles of Example A, when a user prepares to capture an image, in which the main object occupies 20% of the image, using a first imaging device [800] functionally associated with a first ACA [810], the first ACA [810] may determine that the image composition rating is fair (7) whereas when a user prepares to capture an image, in which the main object occupies 26% of the image, using a first imaging device [800] functionally associated with a first ACA [810], the first ACA [810] may determine that the image composition rating is very good (9). Looking to the principles of Example B, when a user prepares to capture an image, in which a man is walking his dog wherein the dog is in the center of the image, using a first imaging device [800] functionally associated with a first ACA [810], the first ACA [810] may determine that the image composition rating is poor (4) whereas when a user prepares to capture an image, in which a man is walking his dog wherein the man is in the center of the image, using a first imaging device [800] functionally associated with a first ACA [810], the first ACA [810] may determine that the image composition rating is good (8).

According to further embodiments of the present invention, the first ACA [810] may be further functionally associated with a first CIM [820], which first CIM [820] may also be integrated (installed), or otherwise functionally associated with the first imaging device [800], and adapted to determine corrective actions to be taken to improve the quality of the composition of images analyzed by the first ACA (i.e. images being sensed by the imaging device). According to yet further embodiments of the present invention a second CIM may be functionally associated with a second imaging device, which second imaging device may not include an ACA, i.e. a CIM may function independently of an ACA.

In other words, a first CIM [820] functionally associated with a first imaging device may be adapted to analyze composition parameters of images captured by the first imaging device [800], prior to and/or after the images have been stored, and determine corrective actions to be taken to improve the quality of the composition of the images.

For example, returning again to the principles of Example A, when a user prepares to capture an image, in which the main object occupies 20% of the image, using a first imaging device [800] functionally associated with a first CIM [820], the first CIM [820] may determine that the corrective action to be taken is to increase the magnification (zoom) until the main object occupies 26% of the image.

Looking to the principles of Example B, when a user prepares to capture an image, in which a man is walking his dog wherein the dog is in the center of the image, using a first imaging device [800] functionally associated with a first CIM [820], the first CIM [820] may determine that the corrective action to be taken is to shift the image to the side until the man is in the center of the image.

Figure 4B:
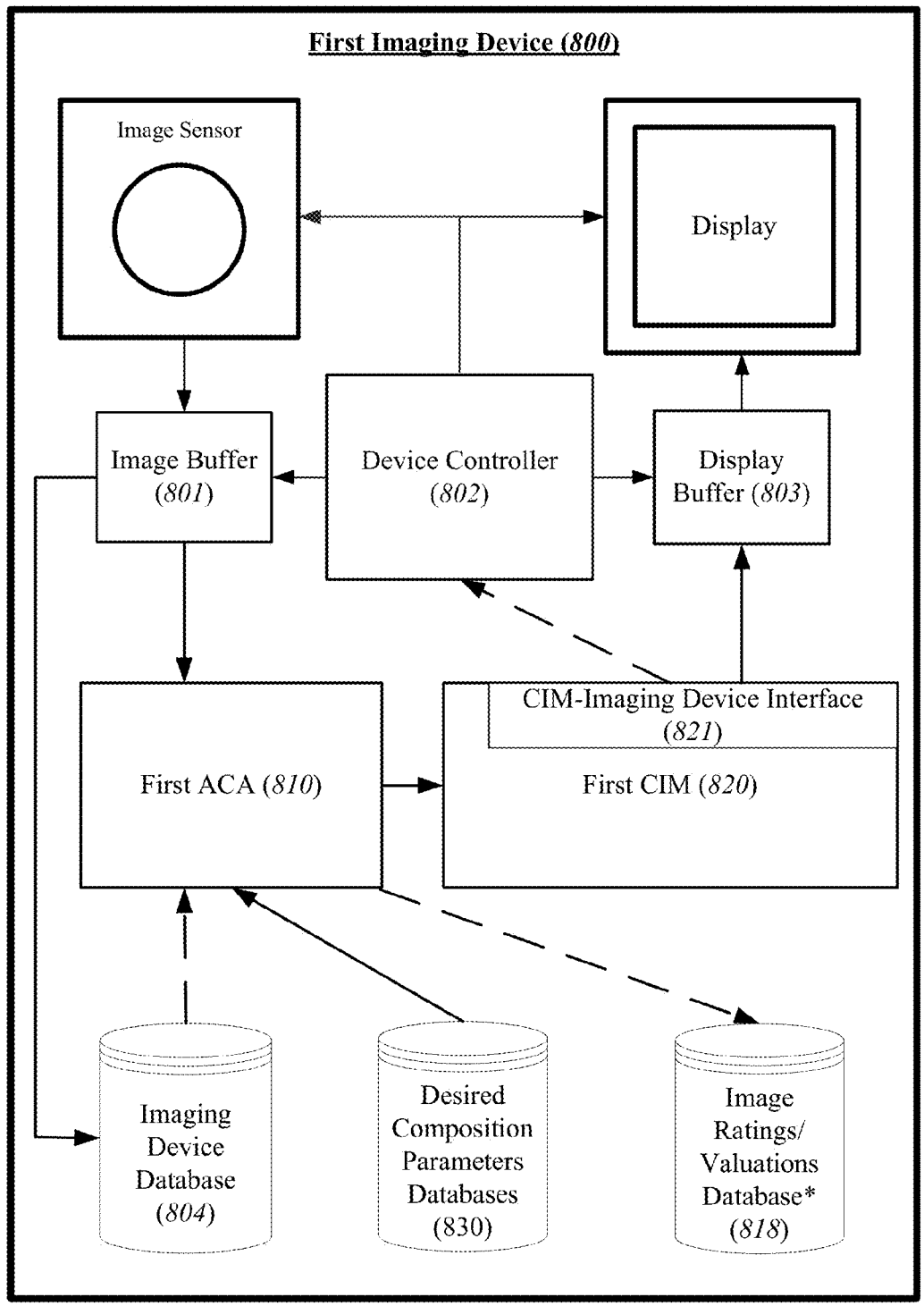
FIG. 4B: is a block diagram of an exemplary First Imaging Device [800] comprising an exemplary CIM-Imaging Device Interface adapted to automatically perform corrective actions determined by the exemplary CIM, in accordance with some embodiments of the present invention.

The first CIM [820] may further include a CIM-Imaging Device Interface [821] comprising interfacing logic adapted to: (1) automatically implement the determined corrective actions by modifying settings/operations of the imaging device (i.e. directly controlling aspects of the imaging device's operation—for example by automatically manipulating the portion of the image sensed being captured (shifting and cropping), manipulating the magnification (zoom), etc. [see FIG. 4B]; and/or (2) display or otherwise advise a user of an imaging device associated with the image, the determined corrective actions.

In other words, a CIM [400] functionally associated with an imaging device may include a CIM-Imaging Device Interface [420] adapted to, prior to and/or after an image has been stored by the imaging device: (1) automatically perform, by directly manipulating aspects of the imaging device's operation, corrective actions that the composition improvement logic has determined may improve the image's composition, and/or (2) advise a user of the imaging device, by displaying instructive symbols to the user, of corrective actions that the composition improvement logic has determined may improve the image's composition. Thus, an imaging device including a CIM [400], which CIM includes a CIM-Imaging Device Interface [420], may be adapted to: (1) automatically perform manipulations of its own operations designed to improve the composition of images it captures, in accordance with stored desired/undesired composition parameter rules/lists/scales;

and/or (2) advise a user of the imaging device of corrective actions to be taken to improve the composition of images captured with the imaging device, in accordance with stored desired/undesired composition parameter rules/lists/scales. For example, returning again to the principles of Example A, when a user prepares to capture an image, in which the main object occupies 20% of the image, using a first imaging device [800] functionally associated with a first CIM [820], which CIM [820] includes a CIM-Imaging Device Interface [821], the CIM-Imaging Device Interface [821] may: (1) automatically increase the magnification (zoom) of the image until the main object occupies 26% of the image; and/or (2) advise the user of the first imaging device that the corrective action to be taken to improve image composition is to increase the magnification (zoom) until the main object occupies 26% of the image.

Looking to the principles of Example B, when a user prepares to capture an image, in which a man is walking his dog wherein the dog is in the center of the image, using a first imaging device [800] functionally associated with a first CIM [820], which CIM [820] includes a CIM-Imaging Device Interface [821], the CIM-Imaging Device Interface [821] may: (1) automatically shift the image to the side until the man is in the center of the image; and/or (2) advise the user of the first imaging device that the corrective action to be taken to improve image composition is to shift the image to the side until the man is in the center of the image.

Figure 4C:
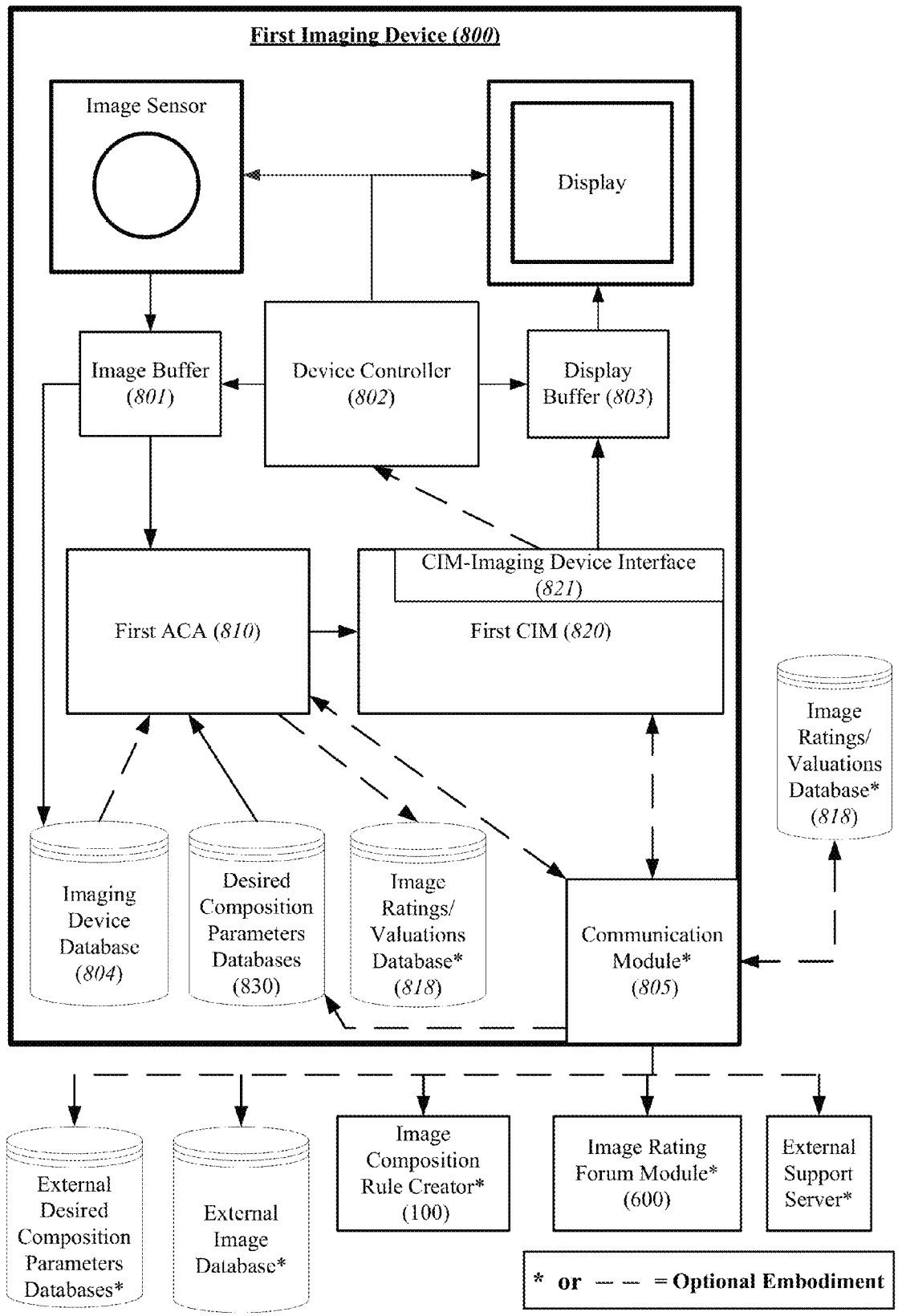
FIG. 4C: is a block diagram of an exemplary First Imaging Device [800] comprising an exemplary communication module adapted to communicate with exterior components, in accordance with some embodiments of the present invention.

According to some embodiments of the present invention, a First Imaging Device may further include a communication module [805] [see FIG. 4C] adapted to communicate with other devices using any communication technology known today or to be devised in the future.

According to further embodiments of the present invention, the CIM-Imaging Device Interface [821] or an associated user interface display module may be further adapted to cause a display of the first imaging device to display to a user of the first Imaging Device [800] the results and or parameters relating to the first ACA's [810] analysis of an image. The CIM-Imaging Device Interface [821] or an associated user interface display module may be yet further adapted to display to a user any other parameters relating to the operations of the first ACA [810] and/or the first CIM [820] and may further provide control elements for a user to input instructions or make modifications regarding these operations.

In other words, an imaging device functionally associated with a CIM [400], may be further adapted to display to a user of the device, possibly in real time, ratings and valuations relating to the composition of images captured by the device (determined by an associated ACA [300]) and/or parameters relating to the operation of the CIM [400] and may be yet further adapted to provide a user of the imaging device with control elements to modify the settings and operations of the CIM [400] and/or an associated ACA [300]. For example, a control element may be provided to:
 (1) modify the rule base on which the operations of the CIM [400] and/or ACA [300] are based (see diversity of desired/undesired image-composition-parameter rule sets described above);
 (2) define which corrective actions are to be performed automatically and which should be advised to the user;
 (3) set which data will be displayed to the user; and/or
 (4) any other modification of the system operation.

Figure 5:
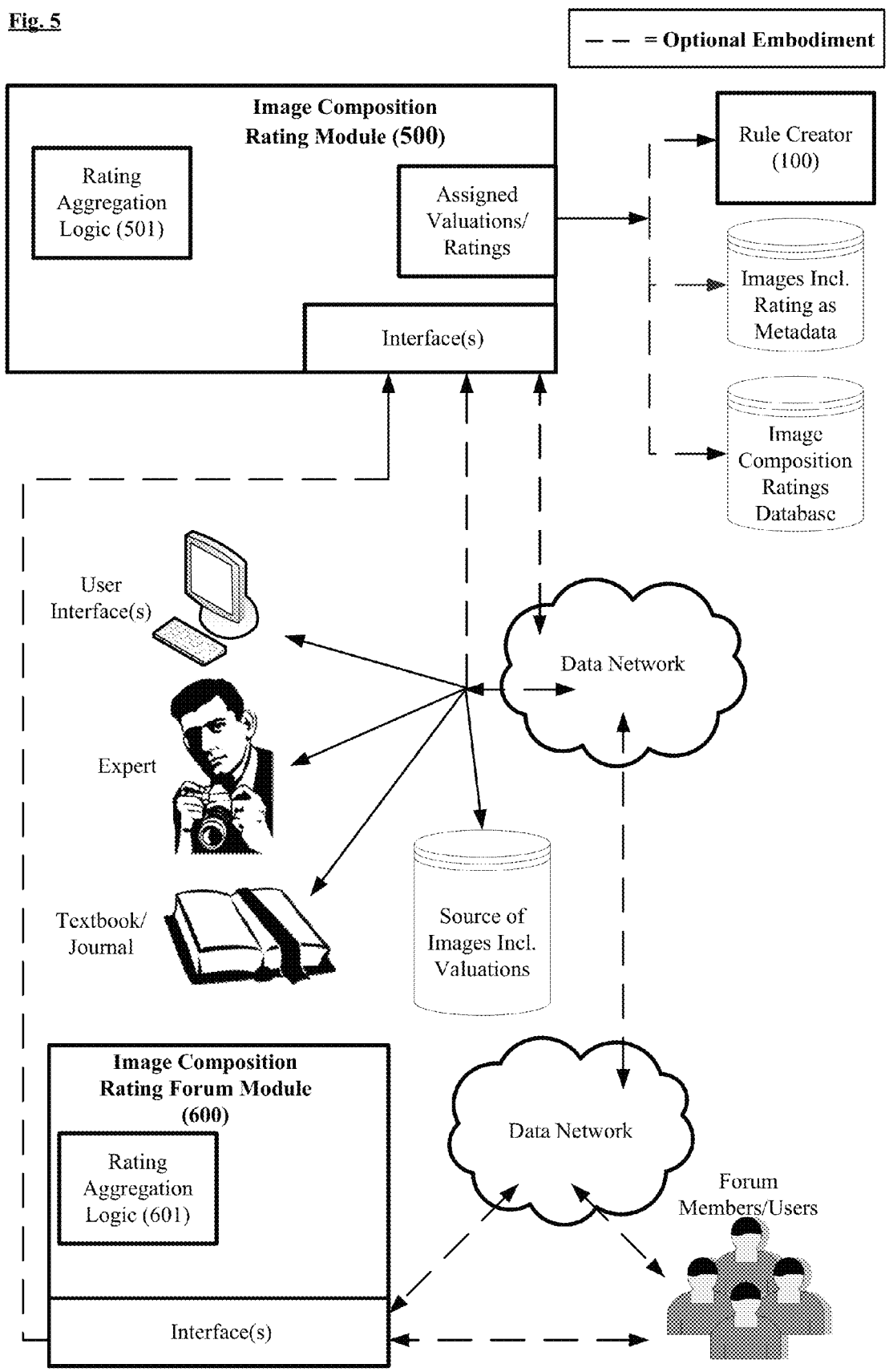
FIG. 5: is a block diagram of an exemplary system for processing images, in accordance with some embodiments of the present invention.

According to further embodiments of the present invention, there may be provided an Image Composition Rating Module [500] [see FIG. 5] comprising rating logic adapted to assign one or more image composition ratings/values to an image. An Image Composition Rating Module [500] may be further adapted to store the assigned values as meta-data associated with the image and/or in an associated Image Composition Ratings Database and/or may be adapted to send the assigned values directly to a Rule Creator [100]. As a Rule Creator [100], in accordance with some embodiments of the present invention, derives desired/undesired composition parameter rules from an input of images associated with rating values, the rating values assigned by an Image Composition Rating Module [500] in combination with the images they are associated with, may then serve a Rule Creator [100] to create image-composition-parameter rules, i.e. the output of an Image Composition Rating Module [500] may serve as input for a Rule Creator [100], such that, in essence, desired/undesired composition parameter rules may be created based on a set of composition-quality values assigned to a set of images by an Image Composition Rating Module [500].

Accordingly, specific sets of image-composition-parameter rules may be generated representing specific sets of images and/or specific rating methods/sources, by a process of first (1) assigning rating values to a specific set of images, using an Image Composition Rating Module [500], wherein the Rating Module [500] is configured to assign rating values based on one or more specific rating methods/sources; and then (2) creating image-composition-parameter rules representing the specific set of images and the specific rating methods/sources, using a Rule Creator [100], wherein the Rule Creator [100] creates image-composition-parameter rules based on an analysis of the specific set of images and their specifically assigned rating values. For Example, if a user were to desire to create a set of image-composition-parameter rules based on his/her own personal taste, this could be accomplished by: (1) assigning rating values representing the users specific taste to a given set of images, by use of a rating module [500] (the user may view a set of images and input ratings for the images through an appropriate interface); and (2) creating image-composition-parameter rules representing the specific set of images and the specific ratings, by inputting the given set of images along with the rating values assigned by the user into a Rule Creator [100]. The resulting rules would naturally represent the user's taste, based on the ratings he assigned the different images within the given set of images, and may then be stored, separately or in combination with other rule sets. It should be understood that by means of such processes, rule bases may be created or modified based on any given rating source or method.

An Image Composition Rating Module [500] may assign image composition-quality values to an image, representing:
 (1) an overall rating of the quality of the composition of an image. For example poor (4), fair (7) or excellent (10);
 (2) ratings of the quality of specific aspects of an image's composition. For example, a rating of lighting quality, a rating of object positioning quality, and so on;
 (3) ratings of the quality of the composition of an image according to a specific source. For example, a rating according to a specific user, a rating according to a specific photographic theory or expert and so on. In other examples, all images appearing in a certain gallery may receive a certain rating, all images from a certain book may receive a certain rating and so on.
 (4) aggregations and/or combinations of 1, 2 and/or 3, and/or
 (5) any other rating relating to the quality of the composition of an image.

An Image Composition Rating Module [500] may assign image-composition-rating values to an image based on:

(1) one or more ratings and/or other valuations assigned to an image, overall or to a specific aspect of the image, by one or more viewers who have viewed and rated the image. Accordingly, an Image Composition Rating Module [500] may be further adapted to receive image ratings and/or valuations entered by users via an appropriate user interface;

(2) one or more ratings and/or other valuations assigned to an image, overall or to a specific aspect of the image, by a specific viewer of the image (e.g. a user of the specific rating module, an expert or other authority, etc.) Accordingly, an Image Composition Rating Module [500] may be further adapted to receive image ratings and/or valuations entered by a specific viewer via an appropriate user interface;

(3) one or more ratings and/or other valuations previously assigned to and associated with an image, overall or to a specific aspect of the image, such as a rating of the image stored as metadata of the image previously by another application or system. Accordingly, an Image Composition Rating Module [500] may be further adapted to retrieve image ratings and/or valuations from data storages and/or other sources where images with ratings/valuations are stored;

(4) based on the source of the image. For example, all images within a specific set of images, may be assigned a certain rating and/or valuation. E.g. a set of images displaying photos by a famous photographer may all be assigned a high composition rating, or a set of images obtained from a certain textbook or journal, may be assigned certain ratings/valuations, and so on. Accordingly, an Image Composition Rating Module [500] may be further adapted to receive, through an appropriate interface, sets of images and to assign the images within the sets image ratings and/or valuations associated with the source of the specific set of images;

(5) one or more ratings and/or other valuations assigned to an image, overall or to a specific aspect of the image, by an image rating forum or similar method. Accordingly, an Image Composition Rating Module [500] may be further adapted to retrieve image ratings and/or valuations assigned to images by such forums or similar methods via an appropriate interface;

(6) an aggregation or average of one or more of 1-5 above. Accordingly, an Image Composition Rating Module [500] may further include image rating aggregation logic [501] defining the methods of aggregation or averaging of the ratings/valuations; and/or (7) any other rating and/or valuation associated with the image.

According to yet further embodiments of the present invention, there may be provided an Image Rating Forum Module [600] [see FIG. 5] adapted to facilitate the rating and/or valuation of images by multiple viewers. An Image Rating Forum Module [600] may comprise rating-forum logic adapted to facilitate the viewing and rating/valuation of images stored in an associated image data storage by multiple viewers via one or more appropriate interfaces. An Image Rating Forum Module [600] may be further adapted to interface with users over a distributed data network (such as the internet), and facilitate the viewing and rating/valuation of images by multiple users via the network. An Image Rating Forum Module [600] may further comprise rating-forum logic [601] adapted to aggregate the ratings/valuations of multiple users into one or more aggregated ratings/valuations. Clearly, many various methods of aggregation may be employed. Furthermore, a rating/valuation of an image assigned to an image by an Image Rating Forum Module [600], may be assigned based on one or more a user inputs (e.g. a numeric rating of the image on a scale of 1-10, "like/dislike" input, etc.), upon one or more user actions relating to the image (e.g. if a user downloads an image from the forum) and/or upon any other rating scheme known today or to be devised in the future.

According to some embodiments of the present invention, an Image Rating Forum Module [600] may be functionally associated with an Image Composition Rating Module [500] and/or directly with an Image Composition Rule Creator [100], such that the Rule Creator [100] may use ratings/valuations provided by the Forum Module [600] to create image-composition-parameter rules, representing the "Forum's opinion".

Furthermore, an Image Rating Forum Module [600] may be functionally associated with an imaging device and further adapted to receive images from the device, either images stored in the device or currently being sensed by the image sensor of the imaging device. The Image Rating Forum Module [600] may be adapted to send a composition-quality value associated with images received from the imaging device back to the imaging device, such that a user of the device may receive real-time, or close to real time, ratings/valuations of images from the Rating Forum.

According to some embodiments of the present invention, there may be provided Personalization Logic, as part of one or more of the other components described above and/or as a separate module. Personalization Logic may be adapted to record, analyze and/or store one or more specific users' usage history and/or preferences and may be further adapted to modify the operation of an imaging device, an Image Composition Rule Creator, an ACA, a CIM and/or an Image Composition Rating Module according to the history and/or preferences of a specific user. Personalization Logic may include processing logic adapted to:

(1) Record a history of images captured by a user;

(2) Record a history of composition ratings assigned to images captured by a user, according to the user, other users, a rating forum, an ACA, and/or any other rating authority.

(3) Analyze histories of a user's recorded images and ratings to determine trends and other statistical information.

(4) Record a history of CIM operations performed in relation to images captured by the user;

(5) Analyze a history of CIM operations performed in relation to images captured by the user, to determine general composition related errors/improvements for the user. For example, returning to the principles of Example A, personalization logic may determine that a user consistently captures images in which the main object is too small and relay this information to a user;

(6) Record a history of user ratings of images and/or create desired/undesired image-composition-parameter rules based on a user's ratings.

Figure 6:
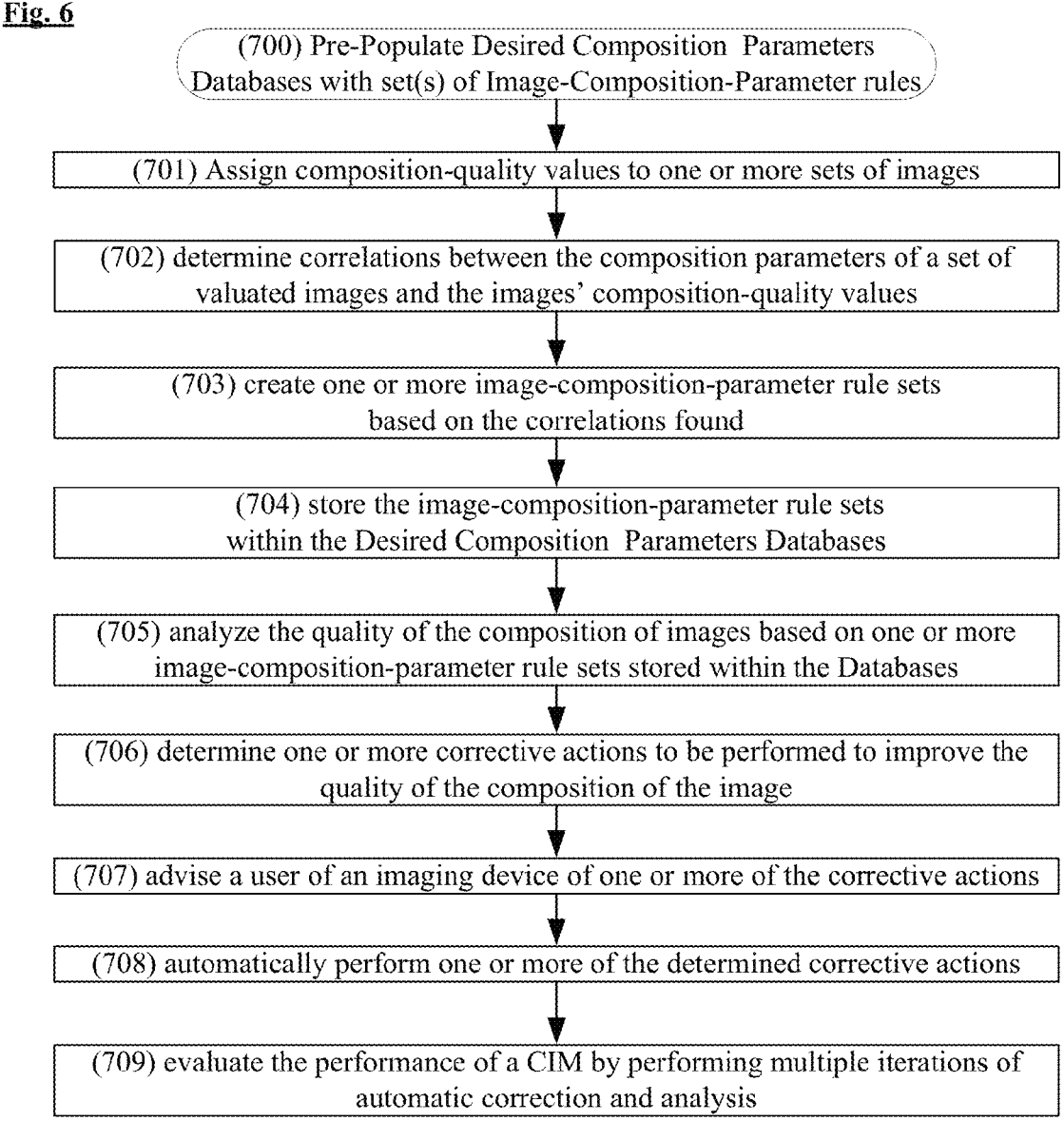
FIG. 6: is a flowchart showing exemplary steps of methods of object-parameter oriented image processing, in accordance with some embodiments of the present invention.

(7) Record user preferences regarding system settings; and/or (8) Modify system operations based on user preferences;

According to further embodiments of the present invention, methods of object-parameter oriented image processing may be provided for: (1) creating image-composition-parameter rule sets, (2) analyzing and valuating the quality of the composition of images, based on an image-composition-parameter rule set, (3) determining one or more corrective actions to be performed to improve the quality of the composition of a given image, based on an image-composition-parameter rule set, and/or (4) advising a user and/or automatically performing one or more of the determined corrective actions. According to some embodiments of the present invention, methods for object-parameter oriented image processing [see FIG. 6] may comprise:

A. [700] pre-populating one or more data storages with one or more image-composition-parameter rule sets;

B. [701] assigning composition-quality values to one or more sets of images based on:

(1) one or more ratings and/or other valuations assigned to an image, overall or to a specific aspect of the image, by one or more viewers who have viewed and rated the image. Accordingly, an Image Composition Rating Module [500] may be further adapted to receive image ratings and/or valuations entered by users via an appropriate user interface;

(2) one or more ratings and/or other valuations assigned to an image, overall or to a specific aspect of the image, by a specific viewer of the image (e.g. a user of the specific rating module, an expert or other authority, etc.) Accordingly, an Image Composition Rating Module [500] may be further adapted to receive image ratings and/or valuations entered by a specific viewer via an appropriate user interface;

(3) one or more ratings and/or other valuations previously assigned to and associated with an image, overall or to a specific aspect of the image, such as a rating of the image stored as metadata of the image previously by another application or system. Accordingly, an Image Composition Rating Module [500] may be further adapted to retrieve image ratings and/or valuations from data storages and/or other sources where images with ratings/valuations are stored;

(4) based on the source of the image. For example, all images within a specific set of images, may be assigned a certain rating and/or valuation. E.g. a set of images displaying photos by a famous photographer may all be assigned a high composition rating, or a set of images obtained from a certain textbook or journal, may be assigned certain ratings/valuations, and so on. Accordingly, an Image Composition Rating Module [500] may be further adapted to receive, through an appropriate interface, sets of images and to assign the images within the sets image ratings and/or valuations associated with the source of the specific set of images;

(5) one or more ratings and/or other valuations assigned to an image, overall or to a specific aspect of the image, by an image rating forum or similar method. Accordingly, an Image Composition Rating Module [500] may be further adapted to retrieve image ratings and/or valuations assigned to images by such forums or similar methods via an appropriate interface;

(6) an aggregation or average of one or more of 1-5 above. Accordingly, an Image Composition Rating Module [500] may further include image rating aggregation logic [501] defining the methods of aggregation or averaging of the ratings/valuations; and/or (7) any other rating and/or valuation associated with the image.

C. [702] determining correlations between the composition parameters of a set of valuated images and the images' composition-quality values;

D. [703] creating one or more image-composition-parameter rule sets based on the correlations found;

E. [704] storing the image-composition-parameter rule sets on an associated data storage, as described above regarding the storage operation of a Rule Creator;

F. [705] analyzing the quality of the composition of images by: (1) recognizing, isolating and/or characterizing objects in an image, (2) extracting parameters relating to the objects recognized in the image, and (3) comparing the extracted composition with an image-composition-parameter rule set;

G. [706] determining one or more corrective actions to be performed to improve the quality of the composition of the image, as described above in relation to the operation of a CIM;

H. [707] advising a user of an imaging device of one or more of the corrective actions;

I. [708] automatically performing one or more of the determined corrective actions by automatically manipulating aspects of an imaging device's operation; and/or J. [709] evaluating the operation of a CIM based on the composition-quality values assigned to images recaptured after a corrective action determined by the CIM has been automatically performed, i.e. performing multiple iterations of correction and analysis while monitoring the results of each iteration.

It should be understood that references to an imaging device in this disclosure are intended to include any device adapted to capture an image sensed by an image sensor, such as a camera (e.g. a digital camera), and/or any device or processing logic adapted to retrieve and/or display images stored in a data storage, such as an image viewing computer application (e.g. picassa). Accordingly, it should be understood that the teachings of this disclosure relating to an image currently being captured by an imaging device may be equally implemented on an image currently being displayed or retrieved from a data storage containing images (e.g. a user's personal photos file).

It should be clear that systems and methods, in accordance with different embodiments of the present invention may include many different possible combinations of the above described components, accordingly providing different combinations of features. Thus, for example, all of the above described components may be integrated into one system, wherein a first Imaging Device comprises an ACA and a CIM and is functionally associated with a rating module and a rating forum. Alternatively only an ACA and CIM may be combined, without an associated rating forum or only a rating forum and associated Rule Creator may be provided and so on.

It should also be understood by one of skill in the art that some of the functions described as being performed by a specific component of the system may be performed by a different component of the system in other embodiments of this invention.

In the description and claims of embodiments of the present invention, each of the words, "comprise" "include" and "have", and forms thereof, are not necessarily limited to members in a list with which the words may be associated.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An image composition analyzer, comprising:
   a web based forum module adapted to receive ratings of a first set of images, from viewers within a web based forum;
   a rule creating module adapted to create or modify one or more sets of image-composition-parameter rules based on an analysis of the received ratings and the composition parameters of the first set of images;
   receiving circuitry adapted to receive image data of a given photographic image;
   an automatic image composition analyzing module (ACA) comprising composition-analyzing logic adapted to:
   (a) automatically identify objects within the given photographic image;
   (b) automatically extract composition parameters relating to the identified objects; and
   (c) compare the extracted composition parameters to the one or more sets of image-composition-parameter rules.

2. An analyzer according to claim 1, further comprising a composition adjustment module adapted to determine one or more composition adjusting actions in relation to the given image, which composition adjusting actions are actions designed to modify the determined image composition parameters of the given image.

3. An analyzer according to claim 2, wherein said composition adjusting actions are determined based on said comparison of the extracted composition parameters to the one or more sets of image-composition-parameter rules.

4. An analyzer according to claim 2, further comprising an interface module adapted to automatically perform said determined adjusting actions.

5. An analyzer according to claim 2, further comprising an interface module adapted to display to a user indications of said determined adjusting actions.

6. A method for analyzing image composition of an image, said method comprising:
   receiving ratings of a first set of images, from viewers within a web based forum;
   creating or modifying one or more sets of image-composition-parameter rules based on an analysis of the received ratings and the composition parameters of the first set of images;
   receiving image data of a first image;
   automatically identifying, by use of processing circuitry, objects within the first image;
   automatically extracting, by use of processing circuitry, composition parameters relating to the identified objects; and
   comparing, by use of processing circuitry, the extracted composition parameters to the one or more sets of image-composition-parameter rules.

7. The method according to claim 6, further comprising determining, by use of processing circuitry, one or more composition adjusting actions in relation to the first image, which composition adjusting actions are actions designed to modify the determined image composition parameters of the first image.

8. The method according to claim 7, wherein said composition adjusting actions are determined based on said comparison of the extracted composition parameters to the one or more sets of image-composition-parameter rules.

9. The method according to claim 7, further comprising automatically performing, by processing circuitry, said determined adjusting actions.

10. The method according to claim 6, further comprising displaying to a user indications of said determined adjusting actions.

* * * * *